United States Patent [19]

Rough, Sr.

[11] 3,951,635

[45] Apr. 20, 1976

[54] METHOD FOR RAPIDLY MELTING AND REFINING GLASS

[75] Inventor: Robert R. Rough, Sr., Toledo, Ohio

[73] Assignee: Owens-Illinois, Inc., Toledo, Ohio

[22] Filed: Nov. 29, 1974

[21] Appl. No.: 528,031

[52] U.S. Cl. .................................... 65/135; 65/136; 65/178; 65/179; 65/347
[51] Int. Cl.$^2$ ..................... C03B 5/16; C03B 5/18
[58] Field of Search .............. 65/134, 180, 179, 135, 65/136, 178, 347

[56] References Cited
UNITED STATES PATENTS

| | | | |
|---|---|---|---|
| 1,750,972 | 3/1930 | Soubier | 65/180 X |
| 2,936,549 | 5/1960 | Stinnes et al. | 65/178 X |
| 3,350,185 | 10/1967 | Rough | 65/135 X |
| 3,519,412 | 7/1970 | Olink | 65/135 X |
| 3,592,623 | 7/1971 | Shepherd | 65/135 X |
| 3,594,259 | 7/1971 | Coen et al. | 65/134 |
| 3,725,025 | 4/1973 | Gimenez | 65/179 |
| 3,754,886 | 8/1973 | Richards et al. | 65/180 X |
| 3,819,350 | 6/1974 | Pellet et al. | 65/134 |
| 3,885,945 | 5/1975 | Rees et al. | 65/136 |

Primary Examiner—S. Leon Bashore
Assistant Examiner—Frank W. Miga
Attorney, Agent, or Firm—D. T. Innis; E. J. Holler

[57] ABSTRACT

In accordance with the method and apparatus of this invention, glass-forming materials are subjected to heat and agitation sufficient to form a molten glass having mostly dissolved glass-forming materials, mostly completed chemical reactions between the glass-forming materials and containing a high number of gaseous inclusions, and containing up to 50 volume percent entrapped gases. This glass appears foamy. The molten glass is transferred to a second chamber to complete melting of any unmelted sand grains remaining from the glass-forming materials, and completes the chemical reactions that remain incompleted, and to remove any remaining cords, and to reduce the foamy character of the melt to a dense molten glass which contains only small-sized gaseous inclusions. This molten glass is then subjected to centrifugal forces sufficient to remove the small-sized gaseous inclusions and thereby produce a refined molten glass having a desired quality of homogeneity and both a reduced number and a different size distribution of gaseous inclusions.

1 Claim, 5 Drawing Figures

METHOD FOR RAPIDLY MELTING AND REFINING GLASS

BACKGROUND OF THE INVENTION

1. Field of the Invention

This invention relates to a method for improving the glass-making process.

2. Description of the Prior Art

Glass is now made in commercial quantities, by introducing glass-forming materials into an apparatus known as a furnace which is likely to hold up to about 240 tons of molten glass, quantities of heat are added to the glass to bring the glass-forming materials to a molten state; additional batch material is fed onto the surface of already molten glass within the furnace, where it floats on the top of the molten glass; and the batch material is gradually melted into the molten mass of glass in the furnace. Physical action and chemical reactions during the heating of the molten mass of glass in the furnace lead to the generation of "gaseous inclusions". These gaseous inclusions are then removed from the molten glass mass by continued heating of the mass in the furnace for periods ranging from 24 to 36 hours. The rate of processing of glass in a prior art furnace is very slow due to the time required to remove the gaseous inclusions formed during the melting process, and accordingly among the objects of the invention are to provide a process wherein the melting, mixing, and homogenizing of the batch glass-forming materials are optimized, over a short process residence time, and in a small volumetric area furnace, to provide a glass having both reduced numbers of undesirable gaseous inclusions, and a change in size distribution of gaseous inclusions.

Thus, a further object of the invention is to provide a method for rapidly melting and refining glass wherein large quantities of molten glass may be prepared by vigorously and continously melting glass forming material, densifying the molten glass and then refining this densified glass in a centrifugal refiner to remove small-sized gaseous inclusions from the glass to produce a glass wherein the homogeneity of the glass is controlled and maximized in terms of the desired end uses.

SUMMARY OF THE INVENTION

Glass-forming materials are subjected simultaneously to heat and agitation sufficient to form a molten glass having undissolved glass-forming materials, cords, and incompleted chemical reactions between the glass-forming materials and containing entrapped air to about a 50 volume percent gas content and thus having a foamy appearance. This molten glass is transferred to another chamber, and spread over an existing pool of molten glass, subjected to a densification step, by an additional heating action to complete the melting of unmelted sand grains and to complete the chemical reactions that may be incomplete and to remove any cords remaining in the molten glass, and to reduce the gas content to small-sized gaseous inclusions. The molten glass containing gaseous inclusions is subjected to centrifugal forces to remove some of the inclusions to produce a refined, homogeneous molten glass.

DESCRIPTION OF THE PREFERRED EMBODIMENTS

Figure 1:
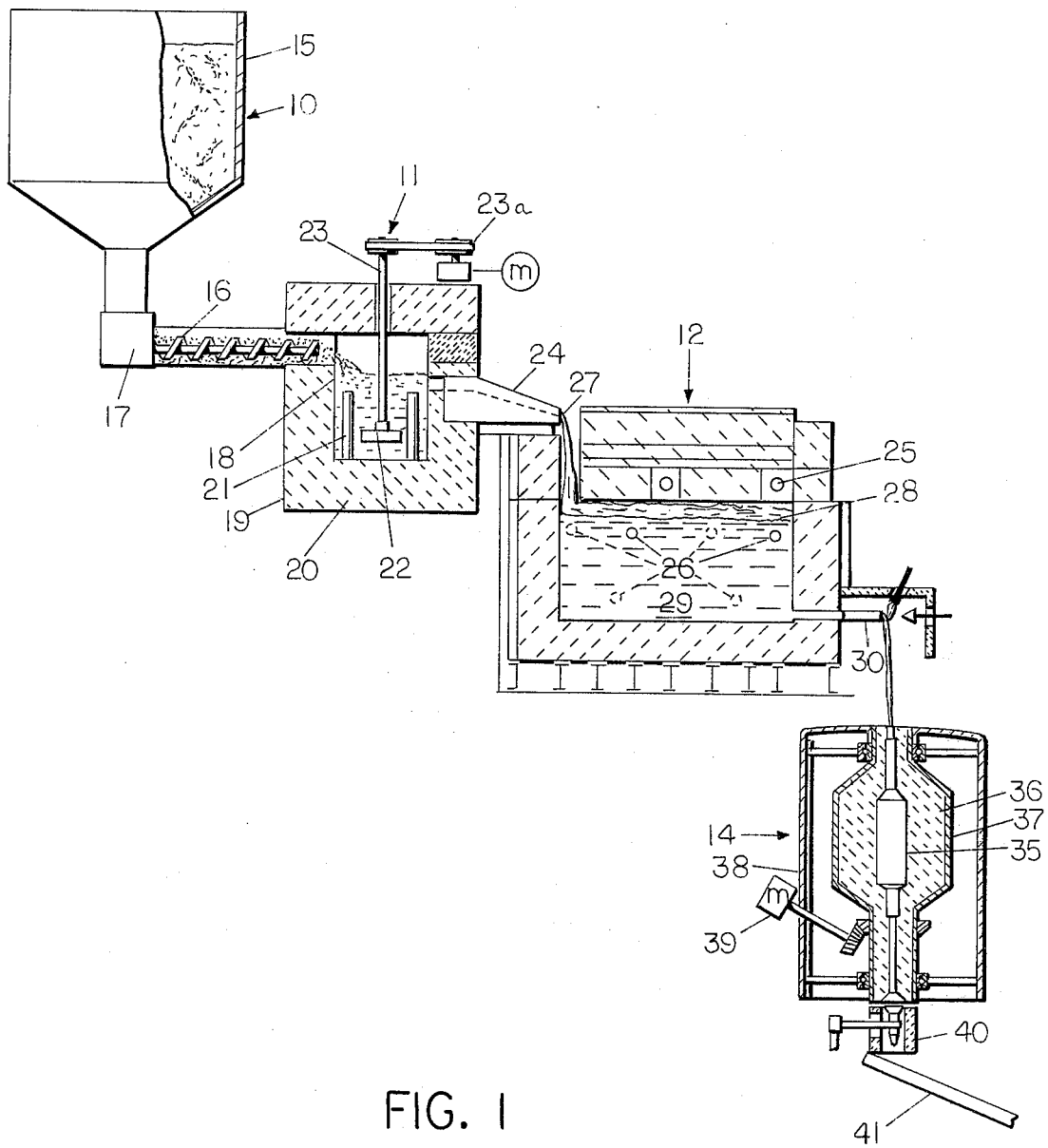
FIG. 1 is a schematic vertical sectional view of the apparatus embodying the invention.
Figure 2:
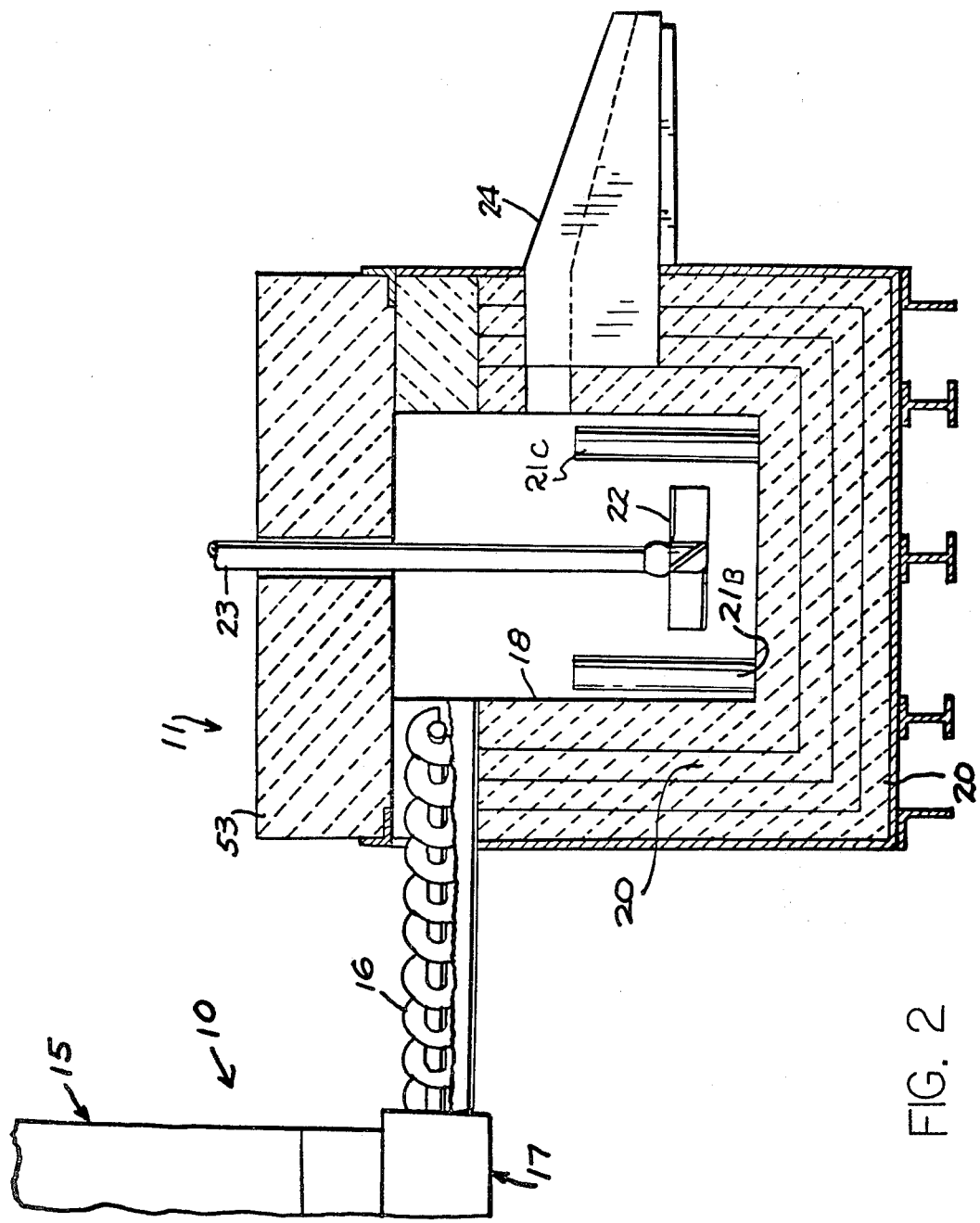
FIG. 2 is a vertical sectional view of the mixing chamber of this invention.

Apparatus for practicing the invention is shown in FIG. 1. The apparatus comprises a batch delivery assembly 10 which delivers glass-forming materials to a first mix-melter 11. The batch materials are simultaneously heated and agitated to form a molten mass of glass having undissolved sand grains, cord-forming undissolved batch material and incompleted chemical reactions between the glass-forming materials and containing gaseous inclusions to about 50 volume percent and having a foamy appearance. The molten, cord-containing glass is delivered to tank 12, the molten glass is subjected to heat which completes the chemical reactions, and removes cords and densifies the foamy glass. The densified molten glass from the tank is delivered to refining apparatus 14 wherein additional gaseous inclusions are removed. The refined molten glass is withdrawn from the lower end of the refining apparatus 14.

Batch delivery apparatus 10 comprises a hopper 15 for containing the glass-forming materials and delivering the materials to a screw 16. The screw 16 is rotated through a drive machanism 17 so that it delivers glass-forming materials to the chamber 18 of mix-melter 11. The mix-melter 11 comprises a steel framework 19 and refractory liners 20 that define the chamber 18. Heat is applied to the glass-forming materials in the chamber 18 utilizing the Joule effect; the molten glass and glass-forming materials in the chamber 18 are agitated vigorously by impeller 22 mounted on shaft 23 which is rotated by a drive mechanism 23A. The degree of heat and agitation applied to the glass-forming materials is sufficient to produce a molten glass. This molten glass having some undissolved glass-forming materials, cords, and incompleted chemical reactions between the glass-forming materials and containing a high number of gaseous inclusions is delivered to a settling tank 12, over trough 24. The tank is constructed of heat resistant material 20. The interior dimensions are: length (five) 5 feet, width (two and one-half) 2.5 feet, and glass depth (three) 3 feet. When the chamber contains molten glass, heat is supplied from the top by crown firing burners 25 and in the molten glass by molybenum electrodes 26.

Figure 3:
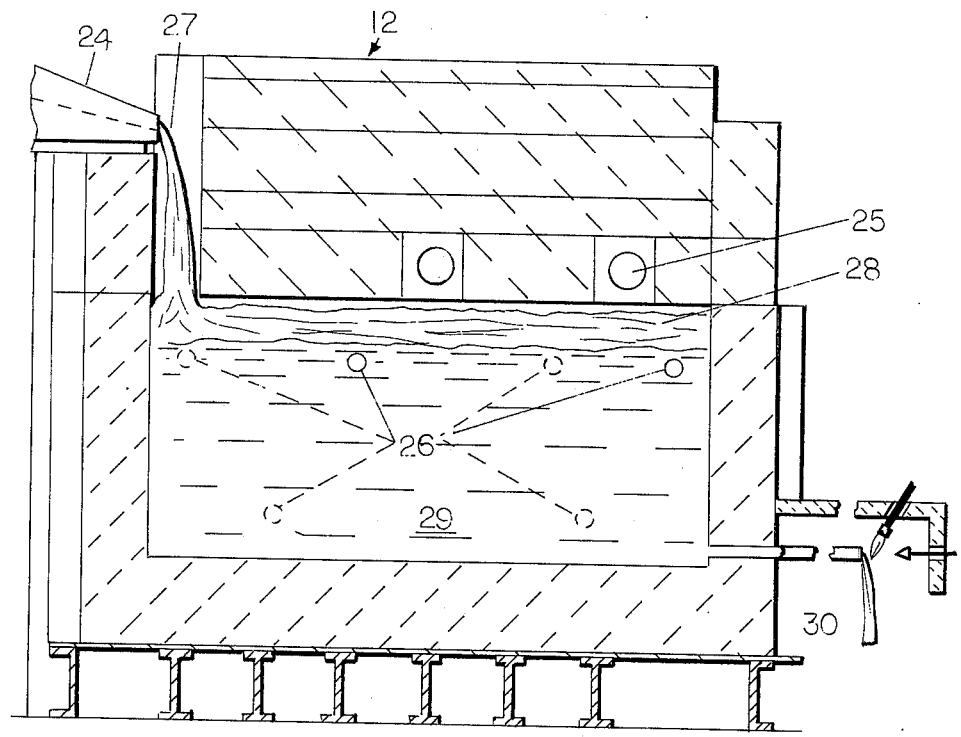
FIG. 3 is a vertical sectional view of the settling tank of this invention.

FIG. 3 is a vertical sectional view of the settling tank 12 showing a charge of molten glass 27 providing a thick layer of foamy glass 28 spreading over the top of the molten mass of glass 29. A discharge tube 30 provides an exit passage for molten glass from the chamber to a subsequent processing operation such as the temperature conditioning unit, not shown, or directly to the centrifugal refining unit 14 as shown.

Figure 4:
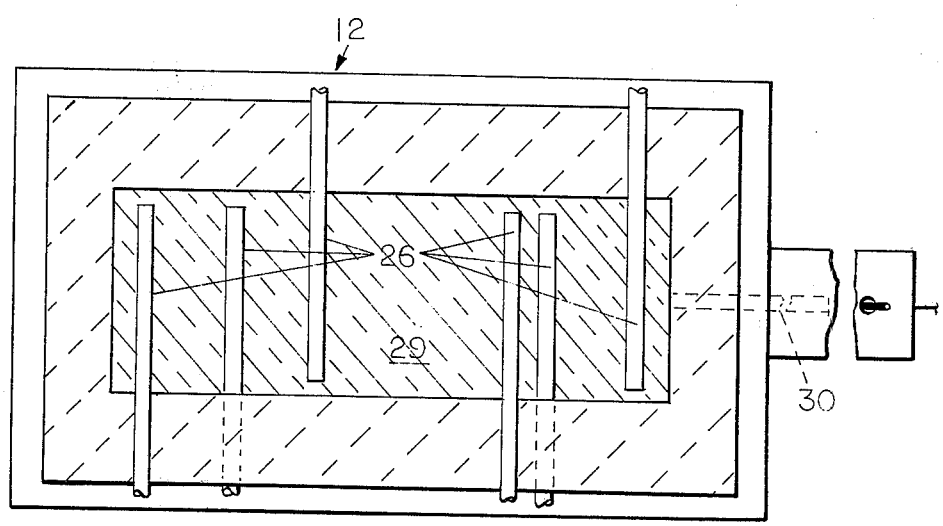
FIG. 4 is a top view of the settling tank of the invention.
Figure 5:
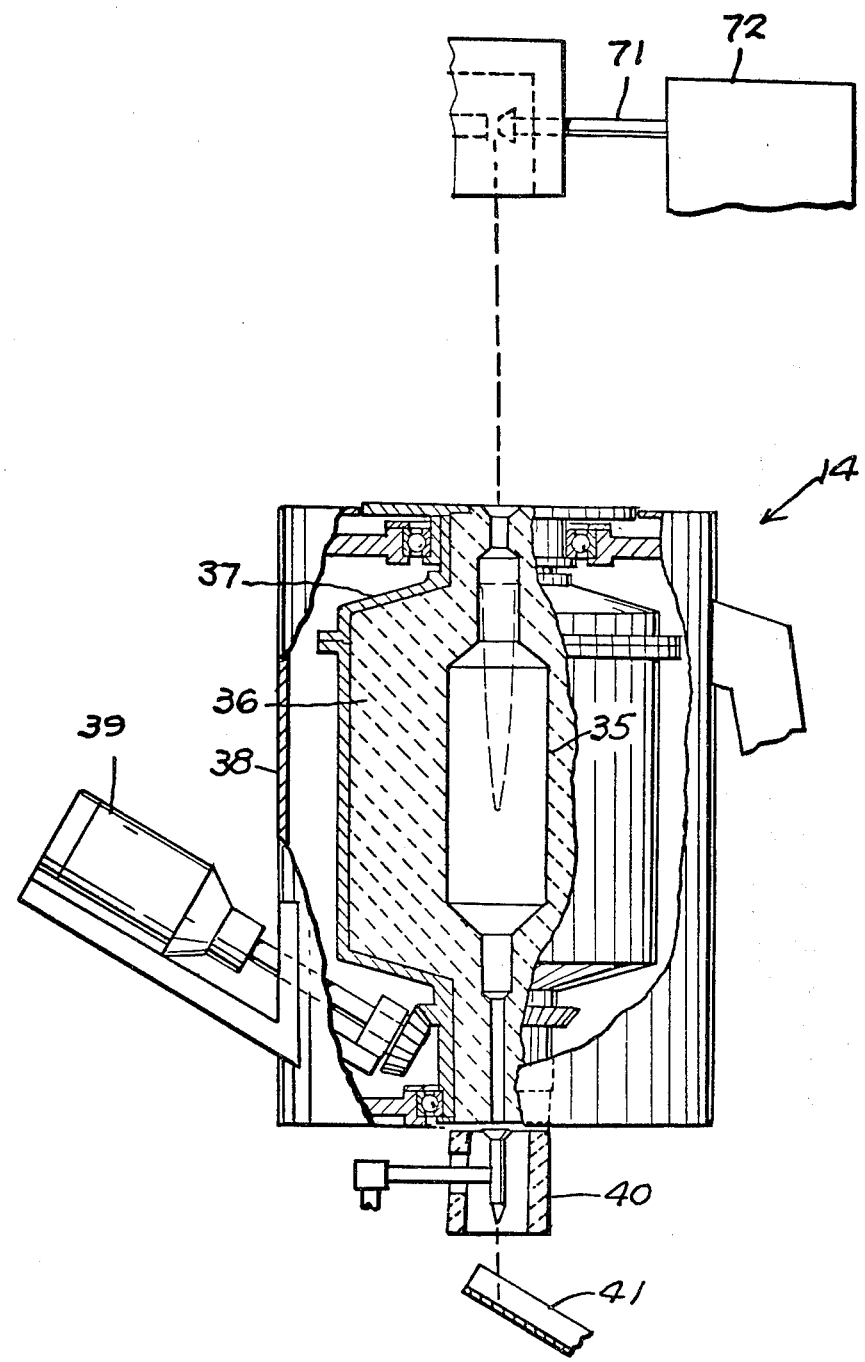
FIG. 5 is a vertical sectional view of the centrifugal refining apparatus of this invention.

FIG. 4 is a top view of the settling tank. A plurality of electrodes 26 are positioned horizontally in the tank; the electrodes are positioned so as to extend through the wall of the tank and extend into the interior of tank.

The centrifugal refining unit 14 is described in U.S. Pat. No. 3,754,886 to Richards et al issued Aug. 28, 1973.

PROCESS

The glass in the several stages in the process is described as follows:

Stage 1 - a mixture of glass-forming materials and molten glass in chamber 18 in the mix-melter 11;

Stage 2 - molten glass having a high number of gaseous inclusions, undissolved sand grains, incompleted chemical reactions, and cords, and having a large volume of entrapped air up to 50 volume percent giving the glass a foamy character, exiting the mix-melter 11;

Stage 3 - homogenized molten glass exiting tank 12, having the glass-forming materials substantially dissolved, having undesirable cords removed, and the chemical reactions substantially completed and containing a great number of gaseous inclusions in the molten glass, however, the glass is densified as contrasted with the foamy appearance in Stage 2; and Stage 4 - refined homogeneous molten glass which exits from the refining unit wherein the glass has gaseous inclusions, but in reduced numbers, and the glass has controlled sizes and numbers of gaseous inclusions.

Mixing and melting in chamber 11 is accomplished by the simultaneous agitation and heating of a mixture of glass-forming materials within the chamber, so that the molten glass is being mixed and the glass-making materials in various stages are being continuously melted. The glass is designated Stage 1 glass, in chamber 11, and comprises raw glass-making materials in various stages of physical and chemical reaction, with gases being evolved and gases being entrapped. Impeller 22 subjects both the molten glass and glass-making materials in the chamber 11 to agitation; as additional glass-making materials are deposited onto the surface of the existing molten glass pool, they are quickly enfolded into the molten pool, and this additional raw material is also thoroughly agitated. Impeller 22 produces a rapid and uniform dispersion of the added glassmaking materials and molten glass; the simultaneous passage of an electric current through the molten glass both melts the additional glass-forming materials and keeps the pool molten.

Glass leaving the mix-melter 11 is a molten glass including a high number of gaseous inclusions, some undissolved sand grains, incompleted chemical reactions, and cords, resulting from inhomogeneity of the molten glass, and the molten glass has about a 50 volume percent gas content, giving the molten glass a foamy character. The molten glass is transferred to tank 12 wherein the surface area heating and localized heating densify the glass within about the first six inches of the molten mass. The remaining 2½ feet of depth of the chamber is filled with dense glass to provide sufficient time for the solution of fine sand grains for homogenization of the glass-forming materials and a decrease in total gaseous inclusion count per unit of mass to less than 400 gaseous inclusions per ounce.

A typical example of the operation of the settling tank is as follows: the crown temperature is raised to 2,632°F; the glass temperature to 2,686°F; electrical thermal energy input of about 29.1KW; the gas thermal energy input about 300 cubic feet per hour; the turnover time 3.8 hours; minimum residence time of about 30 minutes in a tank having a surface area of eleven (11) square feet and a volume, including a throat, of about thirty-three (33) cubic feet.

Under the above conditions, the following glass quality characteristics was observed in glass exiting the settling tank. The glass contained no discernible sand grains and the homogeneity index was $13 \times 10^{-4}$. The glass density at the outlet was 47 gaseous inclusions per ounce in a size range smaller than 0.003 inches in diameter and 23 gaseous inclusions per ounce in the size ranges of 0.003 inches in diameter or greater. Other examples are given in Table I as Run designated A, B, C, D, and F.

TABLE 1

GLASS QUALITY AND CONDITIONS FOR RUNS MADE WITH THE 12 TON/DAY APPARATUS

| Run No. | Homogeneity Index | Gaseous Inclusions/Ounce 0.003" dia. | Gaseous Inclusions/Ounce 0.003"–0.005" dia. | Throughput Rate (Tons/Day) | MACRO Temp. (°F) | MACRO Impeller (rpm) | Settling Tank Glass Temp. |
|---|---|---|---|---|---|---|---|
| A | $14 \times 10^{-4}$ | 120 | 0 | 12 | 2467 | 230 | 2677 |
| B | $14 \times 10^{-4}$ | 190 | 2 | 12 | 2471 | 230 | 2667 |
| C | $14 \times 10^{-4}$ | 30 | 1 | 12 | 2470 | 230 | 2650 |
| E | $15 \times 10^{-4}$ | 80 | 0.3 | 12 | 2512 | 190 | 2676 |
| F | $17 \times 10^{-4}$ | 120 | 0 | 12 | 2445 | 190 | 2542 |

The following are definitions as used in this specification. Furnace turnover time is defined as the time required to process a volume glass which is equivalent to the useful volume of the apparatus. Homogeneity Index is the Shelyubskii Homogeneity Index measured by the techniques described in publications as follows:

Shelyubskii, V. I. (1960) Steklo Keram 17 (8) 17

Shelyubskii, V. I. & Gefen, A. G. (1960) Steklo Keram 19 (11), 13

Bubbles per ounce is defined as the approximate number of gaseous inclusions (bubbles) per ounce of hardened glass.

The glass quality produced by the 12-ton per day system contained no discernible sand grains, had a homogeneity scale to that measured on commercial quality glass containers, and had about 50 to 200 bubbles per ounce with diameter less than 0.003 inches. Glass containers were hand-blown from the molten glass exiting the centrifugal refiners and were impact tested. The test dictated no difference between the bottles made from the glass of this invention and those made of the prior art melting process. A term "trade breakage" refers to breakage resulting when bottles are impacted in the filling line of a processing plant. It was concluded that no difference in trade breakage would occur in containers made with the glass produced in this process.

Glass processing involves a number of steps which proceed simultaneously in the conventional Siemens-type furnace described under prior art herein. The identifiable steps in glass-making process are melting, homogenizing, and refining; in this invention these steps have been made separate process steps and are carried out in discrete modules so that the process condition of each module is thereby subject to a maximization of efficiency. The gaseous inclusion content of the molten glass decreased from a range of 10 to 20,000 bubbles per ounce over the prior art process disclosed in U.S. Pat. No. 3,819,350. The operation of collapsing the foamy nature of the molten glass in the settling tank and densifying the glass significantly improve the refining process. The settling tank requires no mechanical agitation for a small size of about 11 square feet, and the total costs for maintaining heating in the tank and construction of the tank is very small when contrasted to a conventional glass-melting furnace.

The invention reduced the total number of gaseous inclusions in the molten glass as it is discharged from the centrifugal refiner apparatus. This represents a substantial improvement of glass quality as determined by the number of gaseous inclusions in the glass as determined by the number of gaseous inclusions in the glass as contrasted with the prior art process disclosed in U.S. Pat. No. 3,819,350.

Refined homogeneous molten glass is removed from the bottom opening in the chamber and delivered for intended end use.

I claim:

1. A method of making glass which comprises applying heat to glass-forming materials to produce a mass of molten glass;

a. adding glass-forming materials to said mass of molten glass;

b. agitating the mixture of glass-forming materials and molten glass while applying heat to said mixture;

c. continuing the adding, mixing, agitation and application of heat for a time such as to disperse the materials rapidly and uniformly in the mass of molten glass, thus facilitating transfer of heat to the materials and promote rapid chemical reactions until a molten glass is produced which has some small amount of undissolved glass-forming materials, cords, and incompleted chemical reactions between the glassforming materials and contains gaseous inclusions, said molten glass mixture having a foamy appearance due to the gaseous inclusions therein;

d. transferring said foamy glass mixture to a chamber containing a pool of molten glass at an elevated temperature;

e. dispersing said foamy glass over the surface of said molten pool of glass;

f. subjecting said foamy glass to heat both from the pool of glass and from above, whereby said foamy glass gives up the gaseous inclusions and becomes part of the pool of glass, and thereafter rotating the homogenized molten glass containing gaseous inclusions in a centrifugal refining apparatus, and continuing the rotation for a time and at a speed such as to produce pressure gradients within the glass to cause gaseous inclusions to migrate out of the glass, thereby producing a refined molten glass having a controlled number of gaseous inclusions.

* * * * *